US011887098B1

(12) United States Patent
Paulos et al.

(10) Patent No.: US 11,887,098 B1
(45) Date of Patent: Jan. 30, 2024

(54) SYSTEMS AND METHODS FOR PEER-TO-PEER REWARDS AND GIFT CARD TRANSFER VIA MESSAGING

(71) Applicant: Wells Fargo Bank, N.A., San Francisco, CA (US)

(72) Inventors: Stephen Paulos, San Francisco, CA (US); Minhthe Luu, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/115,334

(22) Filed: Dec. 8, 2020

(51) Int. Cl.
    *G06Q 20/32*     (2012.01)
    *G06Q 20/40*     (2012.01)
    *H04L 51/046*     (2022.01)

(52) U.S. Cl.
    CPC ......... *G06Q 20/3223* (2013.01); *G06Q 20/40* (2013.01); *H04L 51/046* (2013.01)

(58) Field of Classification Search
    CPC ... G06Q 20/3223; G06Q 20/40; H04L 51/046
    See application file for complete search history.

(56) References Cited

U.S. PATENT DOCUMENTS

| | | | |
|---|---|---|---|
| 5,937,391 A * | 8/1999 | Ikeda | G06Q 20/06 |
| | | | 705/14.27 |
| 7,953,654 B2 | 5/2011 | Abifaker | |
| 9,852,438 B2 | 12/2017 | Guiney et al. | |
| 10,504,108 B2 | 12/2019 | Laracey | |
| 11,423,395 B1 * | 8/2022 | Kurani | G06Q 20/3676 |
| 2001/0054003 A1 * | 12/2001 | Chien | G06Q 20/10 |
| | | | 705/14.27 |
| 2007/0208627 A1 * | 9/2007 | Abadi | G06Q 30/06 |
| | | | 705/26.8 |

(Continued)

FOREIGN PATENT DOCUMENTS

| | | | | |
|---|---|---|---|---|
| WO | WO-2006055596 A2 * | 5/2006 | | B42D 15/00 |
| WO | WO-2019142050 A1 * | 7/2019 | | G06Q 20/3224 |
| WO | WO-2022014061 A1 * | 1/2022 | | |

OTHER PUBLICATIONS

Make a Gift for a Friend We Have in Common (Year: 2014).*
SMS based Pooled or Collective Monetary Fund (Year: 2013).*

*Primary Examiner* — Bennett M Sigmond
*Assistant Examiner* — James H Miller
(74) *Attorney, Agent, or Firm* — Foley & Lardner LLP

(57) ABSTRACT

A provider institution computing system comprises a network interface circuit and a processing circuit. The processing circuit includes a processor coupled to a non-transitory memory storing instructions that, when executed by the processing circuit, cause the processing circuit to perform operations. The operations include receiving a request from a first messaging application of a sender device to send a gift to a recipient device via a second messaging application of the recipient device. The operations further include verifying that a first account associated with the sender includes a first value of points and converting the first value of points to a first gift value and a second gift value that is different than the first gift value. The operations further include providing a first gift option to the first messaging application, which includes a first gift with the first gift value and a second gift with the second gift value.

20 Claims, 6 Drawing Sheets

(56) References Cited

U.S. PATENT DOCUMENTS

| | | | |
|---|---|---|---|
| 2007/0255652 A1 | 11/2007 | Tumminaro et al. | |
| 2009/0024530 A1* | 1/2009 | Porter | G06Q 30/0601 705/26.1 |
| 2009/0198592 A1* | 8/2009 | Emerson | G06Q 30/0603 705/26.1 |
| 2012/0150732 A1 | 6/2012 | Isaacson et al. | |
| 2012/0215610 A1* | 8/2012 | Amaro | G06Q 30/02 705/14.51 |
| 2013/0030887 A1* | 1/2013 | Calman | G06Q 30/0226 705/14.32 |
| 2013/0144738 A1* | 6/2013 | Qawami | H04W 4/14 705/21 |
| 2013/0159087 A1* | 6/2013 | Boyd | G06Q 30/0233 705/14.33 |
| 2014/0058939 A1* | 2/2014 | Savla | G06Q 20/384 705/42 |
| 2014/0101044 A1* | 4/2014 | Blackhurst | G06Q 20/4015 705/44 |
| 2014/0201012 A1* | 7/2014 | Doran | G06Q 20/354 705/16 |
| 2014/0207628 A1* | 7/2014 | Erez | G06Q 30/0633 705/27.1 |
| 2014/0250001 A1* | 9/2014 | Isaacson | G06Q 20/381 705/39 |
| 2015/0186914 A1* | 7/2015 | Guiney | G06Q 20/223 705/14.27 |
| 2015/0213431 A1 | 7/2015 | Goldstein et al. | |
| 2015/0278801 A1* | 10/2015 | Friedlander | G06Q 20/18 705/41 |
| 2016/0036739 A1* | 2/2016 | Glass | H04W 4/12 709/206 |
| 2016/0232480 A1* | 8/2016 | Erez | G06Q 20/12 |
| 2016/0232609 A1* | 8/2016 | Lindemulder | G07F 9/001 |
| 2017/0011387 A1* | 1/2017 | Lennon | G06Q 30/00 |
| 2017/0039559 A1* | 2/2017 | Frieden | G06Q 20/40 |
| 2017/0161781 A1* | 6/2017 | Parekh | G06Q 20/351 |
| 2017/0213418 A1* | 7/2017 | Schwartz | G06Q 20/381 |
| 2019/0057443 A1* | 2/2019 | Kanjlia | G06Q 20/10 |
| 2019/0108543 A1 | 4/2019 | Chan et al. | |
| 2019/0124021 A1* | 4/2019 | DeMattei | G06F 3/0481 |
| 2019/0392425 A1* | 12/2019 | Butler | G06Q 20/3223 |
| 2019/0392444 A1* | 12/2019 | Butler | G06Q 20/387 |
| 2020/0036720 A1* | 1/2020 | Butler | H04L 63/102 |
| 2020/0074447 A1* | 3/2020 | Isaacson | G06Q 20/10 |
| 2020/0265457 A1* | 8/2020 | Miller | G06Q 20/382 |
| 2020/0294110 A1* | 9/2020 | Sirota | G06Q 30/0603 |
| 2020/0342442 A1* | 10/2020 | Curtis | G06Q 20/34 |
| 2021/0090147 A1* | 3/2021 | Kochhar | G06Q 30/0613 |
| 2021/0174341 A1* | 6/2021 | Araujo | G06Q 20/387 |
| 2022/0005020 A1* | 1/2022 | Moring | G06F 16/2379 |

* cited by examiner

US 11,887,098 B1

SYSTEMS AND METHODS FOR PEER-TO-PEER REWARDS AND GIFT CARD TRANSFER VIA MESSAGING

TECHNICAL FIELD

The present disclosure relates generally to the field of peer-to-peer (p2p) transfers. More particularly, the present disclosure relates to systems and methods for conducting p2p transfers via a messaging application.

BACKGROUND

As part of account management, users may establish rewards accounts with various entities that provide products and/or services (e.g., financial institutions, social media providers, online or physical retailers, etc.). In some instances, the user has an existing account with the entity (e.g., a bank account, a credit account, etc.) and the rewards account is linked to the existing account. In some instances, the user does not have an existing account with the entity and therefore opens a rewards account with the entity to receive the rewards. For each purchase made by the user, points are added to the rewards account of the user typically in proportion to the amount spent on the purchase, and rewards can be redeemed by the user for various benefits provided by the entity.

SUMMARY

One embodiment relates to a provider institution computing system comprising a network interface circuit and a processing circuit coupled to the network interface circuit. The processing circuit includes a processor coupled to a non-transitory memory storing instructions that, when executed by the processing circuit, cause the processing circuit to perform operations. The operations include receiving a request from a first messaging application of a sender device associated with a sender to send a gift to a recipient device associated with a recipient via a second messaging application of the recipient device. The operations further include verifying that a first account associated with the sender includes a first value of points and converting the first value of points to a first gift value and a second gift value, where the first gift value is different than the second gift value. The operations further include providing a first gift option to the first messaging application, where the first gift option includes a first gift with the first gift value and a second gift with the second gift value. A first gift selection is received from the first messaging application and includes one of the first gift or the second gift. Based on a response received from the second messaging application, the operations include determining that the first gift selection is desirable and receiving acceptance of the first gift selection from the second messaging application.

Another embodiment relates to a sender mobile device associated with a sender, the sender mobile device comprising a network interface circuit and a processing circuit coupled to the network interface circuit. The processing circuit includes a processor coupled to a non-transitory memory storing instructions that, when executed by the processor, cause the processing circuit to perform operations. The operations include launching a messaging application to enable a communication between the sender and a recipient, receiving a request from within the messaging application to initiate a transaction with the recipient, and receiving a prompt that is displayed within the messaging application from a provider institution client application on the sender mobile device, the prompt including a plurality of icons associated with the transaction. The operations also include receiving a selection of an icon of the plurality of icons by the sender from within the messaging application, where the selection corresponds to one of a first transaction option or a second transaction option. The operations further include sending a first communication to a recipient messaging application that is viewable by the recipient, where the first communication regarding the selection of the icon by the sender, and receiving a confirmation that the transaction is complete.

A further embodiment relates to a method of sending a first gift from a first messaging application associated with a sender device to a second messaging application associated with a recipient device. A processing circuit authenticates an identity of a sender based on information provided by the sender device associated with the sender. The processing circuit authenticates an identity of a recipient based on information provided by the recipient device associated with the recipient. A processing circuit determines that the first gift is undesirable based on a message received from the second messaging application. An alternative gift option is provided to the second messaging application by the processing circuit, the alternative gift option including a first alternative gift and a second alternative gift, wherein the first alternative gift and the second alternative gift are different than the first gift. A first value of the first gift is converted to a first alternative value of the first alternative gift and a second alternative value of the second alternative gift. The first value, the first alternative value, and the second alternative value correspond to a value of points in an account held by the sender. The method further includes receiving a second gift selection from the second messaging application, where the second gift selection includes one of the first alternative gift and the second alternative gift. The method also includes receiving information related to the second gift selection, where the information related to the second gift selection is associated with the recipient.

These and other features, together with the organization and manner of operation thereof, will become apparent from the following detailed description when taken in conjunction with the accompanying drawings.

DETAILED DESCRIPTION

Figure 1:
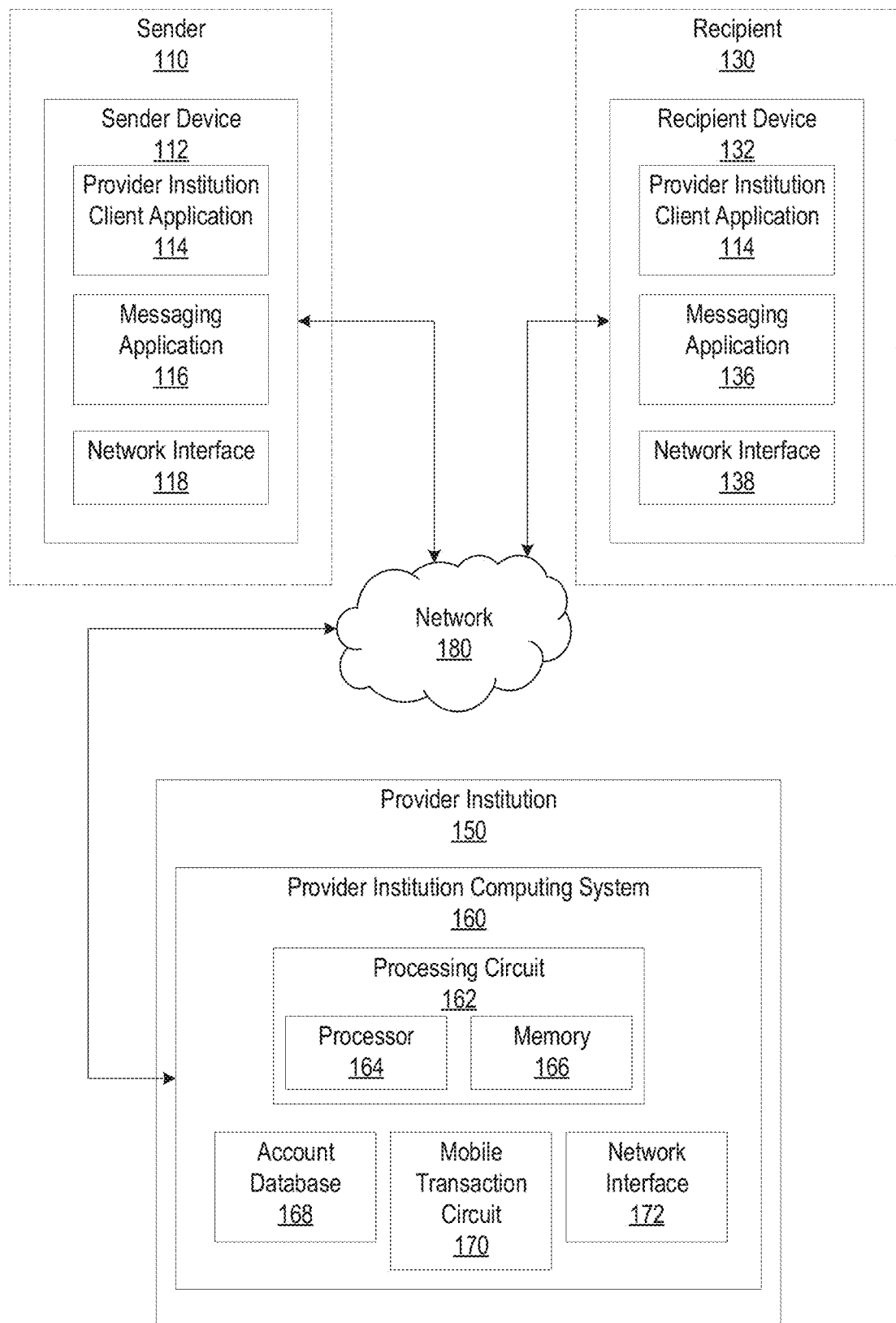
FIG. 1 is a block diagram of a p2p gift computing system, according to an example embodiment.

Referring to the Figures generally, in some instances, a user may wish to transfer the user's rewards to a recipient as a gift via a p2p transfer, where the gift is an electronic gift card (hereinafter referred to as an "e-gift card"). The gift can also be a direct transfer of the user's rewards to the recipient's account. However, if the recipient does not have a rewards account with the entity, the recipient is required to set up an account before being able to receive the rewards. Further, the recipient may not desire rewards from the entity at all. In addition, the recipient may not desire to use the e-gift card (for example, the recipient may not shop at the vendor for which the e-gift card was provided). These effects can harm user experience.

Systems and methods for conducting a p2p transaction to provide a gift card and/or rewards points from a sender to a recipient are described according to various embodiments herein. The system includes a provider institution computing system, a sender device associated with a sender, and a recipient device associated with a recipient. The provider institution computing system includes an account database (e.g., a database including information related to rewards accounts of customers), a network interface, a mobile transaction circuit, and a processing circuit communicatively coupled to the account database, the network interface, and the mobile transaction circuit. The processing circuit is structured to receive a request from a messaging application of the sender device to send a first gift (e.g., an e-gift card, rewards points, etc.) to a messaging application of the recipient device. Payment for the first gift is based on a value associated with a value of a rewards account of the sender and not a value associated with a monetary account (e.g., a checking account, savings account, investment account, etc.). The processing circuit is further structured to send the first gift to the recipient device, where the recipient can determine whether the first gift is acceptable or unacceptable.

Upon receiving confirmation that the first gift is acceptable (e.g., the recipient desires the gift selected by the sender), the processing circuit executes the transaction (e.g., the processing circuit provides the first gift to the recipient and deducts the appropriate value from the sender's account). Upon receiving confirmation that the gift is not acceptable (e.g., the recipient does not desire the gift selected by the sender), the processing circuit provides gift alternatives to the recipient via the messaging application of the recipient device. When the processing circuit receives confirmation from the recipient device that an alternative gift is acceptable, the processing circuit executes the transaction (e.g., the processing circuit provides the selected alternative gift to the recipient via the messaging application of the recipient device, and deducts the appropriate value from the sender's account). The processing circuit sends the sender confirmation that the recipient accepted the gift, and may not disclose that the recipient chose an alternative gift.

The embodiments and implementations of the systems and methods disclosed herein improve current computing systems by facilitating a p2p transaction where the transaction is not based on a monetary account, but a rewards based account. Computing systems are improved by eliminating the need to convert rewards points to cash and then using the cash to purchase an e-gift card. Advantageously, these systems, methods, and computer implementations enable a sender to quickly send a gift (e.g., an e-gift card, rewards points, etc.) to a recipient via a messaging application, where the gift is funded via the sender's rewards account.

The messaging application may communicate directly with various third party entities to facilitate the p2p transaction, thereby avoiding the need for the user to switch between multiple applications to execute the transaction and making the transaction more convenient and easier for the user. In addition, the systems, methods, and computer implementations described herein provide an improved user interface via the messaging application that reduces the number of interactions with the messaging application that a user must perform to facilitate and/or execute a p2p transaction. Reducing the number of interactions may reduce processing power and increase bandwidth, which may in turn improve the functionality of the device on which the messaging application is executed (e.g., a user device). Furthermore, the systems, methods, and computer implementations described herein enable a recipient to quickly receive the gift and, if the gift is undesirable, select an alternative gift without the knowledge of the sender. As such, the systems, methods, and computer implementations disclosed herein improve the gift-giving process by 1) enabling a faster transaction by conducting the transaction through a messaging application on the sender device and the recipient device, and 2) avoiding instances of unwanted e-gift cards or rewards points where the recipient cannot return or exchange for other items. As such, the systems, methods, and computer implementations disclosed herein improve the functioning of such systems by providing functionalities that are novel and non-obvious improvements over current systems.

Referring now to FIG. 1, a block diagram of a p2p computing system 100 is shown, according to an example embodiment. The p2p computing system 100 includes a sender device 112 associated with a sender 110, a recipient device 132 associated with a recipient 130, and a provider institution computing system 160 associated with a provider institution 150. The components of FIG. 1 may be communicatively and operatively coupled to each other over a network 180. The network 180 may be any type of type of network. For example, the network 180 may be a wireless network interface (e.g., 802.11X, ZigBee, Bluetooth, Internet, etc.), a wired network interface (e.g., Ethernet), or any combination thereof. The network 180 is structured to permit the exchange of data, values, instructions, messages, and the like between and among the sender device 112, the recipient device 132 and the provider institution computing system 160.

The provider institution 150 is an entity that provides one or more goods or services. In the example depicted, the provider institution 150 is a financial institution capable of providing one or more financial products and services (e.g., banking (e.g., the providing of various accounts, such as a demand deposit account), lending, money transfers, issuing credit and/or debit cards, wealth management, etc.). Thus, the associated provider institution computing system 160 is structured to provide or otherwise facilitate providing the one or more financial products and services to customers. As such, the provider institution may also be referred to as a financial institution herein that provides banking services to customers. For example, customers can deposit funds into accounts, withdraw funds from accounts, transfer funds between accounts, view account balances, and the like via the provider institution computing system 160. As described herein, the provider institution computing system 160 is structured to support at least some of the functions and services described below. As depicted, the provider institution computing system 160 is a backend computer system that supports the sender device 112, the recipient device 132, and other services offered by the provider, e.g., financial services offered by the provider institution 150.

As shown, the provider institution computing system 160 includes a processing circuit 162 that includes a processor 164 and a memory device 166. The processor 164 may be implemented as one or more server processors, application specific integrated circuits (ASIC), field programmable gate arrays (FPGAs), digital signal processor (DSP), microprocessors, or other suitable electronic processing components. The server(s) or server computer may be geographically dispersed relative to other server(s) of the provider institution computing system 160. Further, there may be a variety of different types of server(s) included in the computing system 160 (e.g., application server, database server, catalog sever, communications server, web server, and so on). The memory device may be included with the server(s). The memory device 166 (e.g., RAM, ROM, NVRAM, Flash Memory, hard disk storage, etc.) may store data and/or computer code for facilitating at least some of the various processes described herein. In this regard, the memory device 166 may store programming logic that, when executed by the processor 164, controls the operation at least partly of the provider institution computing system 160.

The provider institution computing system 160 also includes a network interface 172. The network interface 172 facilitates the sending and receiving of data, information, and/or communications over the network 180 (e.g., to and from the sender device 112, the recipient device 132, etc.). As mentioned above, in this example, the provider institution 150 is structured as a financial institution.

The account database 168 is structured to maintain accounts associated with customers of the provider institution 150 to help facilitate transactions associated with the accounts. The account database 168 may store transaction data and account and customer information, including account numbers, account balances, customer contact information, customer preferences, and other account information. In some embodiments, the account database 168 includes account information associated with a rewards account for a customer. As used herein, the term "transaction data" may be used to refer to data associated with a transaction including, but not limited to, a payment, expense, debit, credit, contribution, donation, etc. which may be associated with the account of a user of the provider institution 150. As used herein, the term "rewards account" may be used to refer to a non-monetary account, where the balance of the rewards account is based or may be based on the transaction data of the customer. For example, when the customer purchases items a grocery store with a credit card associated with the provider institution 150, the provider institution computing system 160 allocates an amount of rewards points to the rewards account associated with the customer in the account database 168. The amount of rewards points allocated is proportional to the amount spent (e.g., for every twenty dollars spent, the customer receives ten rewards points). Alternatively and as an incentive, the customer may be gifted/provided a certain amount of rewards points or loyalty points upon opening an account with the provider institution.

As shown, the provider institution computing system 160 also includes a mobile transaction circuit 170. The mobile transaction circuit 170 is structured to permit, enable, facilitate, manage, process, and/or otherwise allow p2p transactions. As used herein, the term "p2p mobile transaction" or "p2p transaction" is meant to be broadly interpreted to refer to transactions between two or more mobile devices (e.g., mobile phone, tablet computer, smart watch, fitness tracker, etc.), where the mobile devices are associated with different users (e.g., the sender 110 and the recipient 130). As shown, the mobile transaction circuit 170 is part of the provider institution computing system 160. In other embodiments, the mobile transaction circuit 170 may be owned by, associated with, or otherwise operated by a third party relative to the provider institution 150.

In some embodiments, the mobile transaction circuit 170 is structured to communicate, via the network interface 172, with various third party vendors. As used herein, the term "third party vendor" is used to refer to any vendor from which a gift (e.g., an e-gift card, rewards points, etc.) may be provided. Examples of third party vendors include, but are not limited to, retail stores, grocery stores, restaurants, etc. The mobile transaction circuit 170 can determine, based on amount of rewards available in a rewards account associated with the sender 110, a maximum dollar value of an e-gift card that the sender 110 can send to the recipient 130. For example, the rewards account associated with the sender 110 may include 10,000 rewards points. For vendor A (for example, a retail store), each reward point may have a dollar value equivalent to $0.01. Accordingly, the mobile transaction circuit 170 determines that the maximum dollar value of a gift card that can be provided for vendor A is $100. For vendor B (for example, a restaurant), each reward point may have a dollar value equivalent to $0.005. Accordingly, the mobile transaction circuit 170 determines that the maximum dollar value of a gift card that can be provided for vendor B is $50. The mobile transaction circuit 170 is structured to provide e-gift card options to the sender device 112 such that the sender 110 can choose the e-gift card (e.g., both the vendor and the amount) to send to the recipient 130 via the recipient device 132.

In some embodiments, the mobile transaction circuit 170 is structured to receive e-gift card information from a third party vendor after the sender 110 determines from which vendor to send an e-gift card. For example, the sender 110 may decide to send the recipient an e-gift card for vendor A in the amount of $100. The sender 110 notifies the mobile transaction circuit 170 of the choice via the sender device 112, and the mobile transaction circuit 170 receives information associated with the e-gift card. The information may include, for example, an e-gift card number, an authentication number, a code (e.g., a bar code, a quick response (QR) code, etc.) that can be scanned, and any other information that may identify the e-gift card and the value associated with the e-gift card for use with the designated vendor. In some embodiments, after the information associated with the e-gift card is received, the e-gift card cannot be returned or canceled.

In some embodiments, the mobile transaction circuit 170 is structured to receive e-gift card information from a third party vendor after the recipient 130 determines that the e-gift card provided by the sender 110 is desirable. For example, after the sender 110 determines which e-gift card to send to the recipient 130, the mobile transaction circuit 170 notifies the recipient 130 that the sender 110 has sent the recipient 130 an e-gift card for vendor A in the amount of $100. In some instances, the recipient 130 may not desire an e-gift card for vendor A, and the recipient 130 notifies the mobile transaction circuit 170 via the recipient device 132. The mobile transaction circuit 170 can then present the recipient 130 with alternative e-gift card options (for example, $50 to vendor B, $100 to vendor C, etc.) from which the recipient 130 can choose a more desirable e-gift card. After receiving the choice of the recipient 130, the mobile transaction circuit 170 receives information associated with the alternative e-gift card. The information may include, for example, an e-gift card number, an authentication number, a code (e.g., a bar code, a quick response (QR) code, etc.) that can be scanned, and any other information that may identify the alternative e-gift card and the value associated with the alternative e-gift card for use with the designated vendor.

The mobile transaction circuit 170 is also structured to send a confirmation to the sender 110 via the sender device 112 when the recipient 130 receives the e-gift card via the recipient device 132. In some embodiments, the confirmation includes information related to the e-gift card (e.g., the name of the vendor and the amount of the e-gift card). In some embodiments, the confirmation masks (e.g., omits, obscures, redacts, or otherwise removes) information related to the alternative e-gift card. For example, the confirmation may simply provide notification that the recipient received the alternative e-gift card but not provide any information related to the alternative e-gift card. Providing a notification that masks information related to the alternative e-gift card prevents the sender 110 from knowing if the recipient 130 chose the alternative e-gift card (which is different than the e-gift card chosen by the sender 110), thereby providing an efficient e-gift card transaction where both parties are satisfied with the outcome (e.g., the sender 110 believes that the recipient is happy with the chosen e-gift card and the recipient is happy with the chosen alternative e-gift card).

In some embodiments, the mobile transaction circuit 170 is structured to communicate with the account database 168 to determine an amount of rewards points in the rewards account of the sender 110 that are available to be transferred to the recipient 130 as a gift. The mobile transaction circuit 170 notifies the sender 110 via the sender device 112 of the available rewards, and the sender 110 selects an amount of rewards to send as a gift. The mobile transaction circuit 170 can also determine, based on an amount of rewards selected by the sender 110, an equivalent amount of rewards associated with rewards accounts of the third party vendors. For example, the sender 110 may elect to send 5,000 rewards points to the recipient 130. The mobile transaction circuit 170 is structured to determine the equivalent number of rewards points associated with the third party vendors. For example, 5,000 rewards points for the provider institution 150 may be equivalent to 7,000 rewards points for vendor C and 3,000 rewards points for vendor D.

To make such a determination, the mobile transaction circuit 170 may reference a lookup table that includes relative values of rewards points for various third party vendors and rewards points for the provider institution 150. In other embodiments, the mobile transaction circuit 170 may compare the dollar value of goods that can be purchased with rewards points from the various third party vendors to determine the relative values of each reward point. For example, the mobile transaction circuit 170 may determine purchasing a $10 gift card for a certain vendor would require 1,000 rewards points from the provider institution 150, 2,000 rewards points from vendor C (for example, a grocery store), and 4,000 rewards points from vendor D (for example, a clothing store). Accordingly, one reward point from the provider institution 150 is worth 2 reward points from vendor C and 4 reward points from vendor D.

In some embodiments, similar to the mobile transaction circuit 170, the sender device 112 is structured and configured to determine an amount of rewards points in the rewards account of the sender 110 that are available to be transferred to the recipient 130 determine an equivalent amount of rewards associated with rewards accounts of the third party vendors. The sender device 112 may also be structured and configured to determine, based on an amount of rewards selected by the sender 110, an equivalent amount of rewards associated with rewards accounts of the third party vendors. The determination may be made by referencing a lookup table, in some embodiments. In some embodiments, a processor within the sender device 112 may execute an algorithm that includes logic from which the determination may be made.

In some embodiments, the mobile transaction circuit 170 is structured to send the selected amount of rewards points to the rewards account of the recipient 130 after the sender 110 notifies the mobile transaction circuit 170 of the amount of rewards points to send via the sender device 112. After sending the rewards points to the rewards account of the recipient 130, the account database 168 updates the rewards points balances of the rewards accounts for the sender 110 and the recipient 130.

In some embodiments, the mobile transaction circuit 170 is structured to send the selected amount of rewards points to the rewards account of the recipient 130 after the recipient 130 determines that the rewards points provided by the sender 110 are desirable. For example, after the sender 110 determines the amount of rewards points to send to the recipient 130, the mobile transaction circuit 170 notifies the recipient 130 via the recipient device 132 that the sender 110 sent the recipient 130 the specified amount of rewards points for the provider institution 150. In some instances, the recipient 130 may not desire rewards points for the provider institution 150. For example, the recipient 130 may not have a rewards account with the provider institution 150 and may desire to receive rewards points for a third party vendor (e.g., vendor C, vendor D, etc.). In such instances, the recipient 130 notifies the mobile transaction circuit 170 via the recipient device 132 that rewards points for the provider institution 150 are undesirable. The mobile transaction circuit 170 can then present the recipient 130 with alternative rewards points options (for example, 2000 points to vendor C, 3000 points to vendor D, etc.) from which the recipient 130 can choose a more desirable gift. After receiving the choice of the recipient 130 via the recipient device 132, the mobile transaction circuit 170 sends the selected rewards to the rewards account of the recipient 130. After sending the rewards points to the rewards account of the recipient 130, the account database 168 updates the rewards points balance of the rewards account for the sender 110.

In some embodiments as described above, the mobile transaction circuit 170 is structured to convert the selected amount of rewards points to a cash equivalent based on the relative values of the rewards points. Referring to the example above, 1,000 rewards points from the provider institution 150 is equivalent to $10 cash (e.g., because the rewards points can be used to purchase a $10 gift card from a variety of vendors, the rewards points have a cash equivalent value of $10). In some embodiments, the mobile transaction circuit 170 sends the cash equivalent of the rewards points and/or gift card to the recipient such that the cash is added to a bank account of the recipient. For example, upon selecting an option to receive a cash equivalent, the recipient may be required to enter account information related to the account to which the cash should be added. The mobile transaction circuit 170 can then deposit the funds into the account of the recipient.

The sender device 112 and the recipient device 132 may be or include a mobile device (i.e., a device that is substantially portable or movable as opposed to a stationary or fixed device) and/or a wearable device. As referred to herein, a "wearable device" refers to any type of device that the sender 110 or the recipient 130 wears including, but not limited to, a watch (e.g., a smart watch), glasses (e.g., eye glasses, sun glasses, smart glasses, etc.), bracelet (e.g., a smart bracelet), etc. The sender device 112 and the recipient device 132 may also include any type of mobile device including, but not limited to, a phone (e.g., a smartphone, etc.) and/or a computing device (e.g., a tablet computer, a laptop computer, a person digital assistant, etc.). The sender device 112 and the recipient device 132 may also include voice-activated digital assistance devices (e.g., a voice activated device structured to assist a user, smart speakers having chat bot capabilities, etc.), portable media devices, vehicle infotainment systems, etc. that may access one or more programs, servers, networks, central computers, etc. Accordingly, the sender device 112 and the recipient device 132 may include a display device (e.g., a screen) and one or more input/output devices (e.g., a touch screen, microphone, speaker, keyboard, etc.). In the example depicted, the sender device 112 and the recipient device 132 are structured as smartphones.

The sender device 112 and the recipient device 132 are shown to include a provider institution client application 114. The provider institution client application 114 may be a server-based application executable on the sender device 112 and the recipient device 132. In this regard, the sender 110 and the recipient 130 may have to first download the provider institution client application 114 prior to its usage. In another embodiment, the provider institution client application 114 may be hard coded into the memory of the sender device 112 and the recipient device 132. In an alternative embodiment, the provider institution client application 114 may be a web-based interface application. In this configuration, the sender 110 and the recipient 130 may have to log onto or access the web-based interface before usage of the provider institution client application 114. Furthermore, the provider institution client application 114 may be at least partly supported by a separate computing system comprising one or more servers, processors, network interface modules, etc., that transmit the provider institution client application 114 for use to the sender device 112 and the recipient device 132. In yet another alternative embodiment, the provider institution client application 114 includes its own set of dedicated hardware components or substantially dedicated hardware components and associated logic. To facilitate integration, the provider institution client application 114 may include an application programming interface (API) and/or a software development kit (SDK) that facilitate the integration of other applications with the provider institution client application 114. For example, a messaging application 116 and a messaging application 136 may provide access to the provider institution client application 114 within the respective messaging applications. All such variations and combinations are intended to fall within the spirit and scope of the present disclosure.

The provider institution client application 114 may be communicably coupled to the provider institution computing system 160 (e.g., the mobile transaction circuit 170, the account database 168, etc.) via the network 180 and may be structured to facilitate transactions between, for example, the sender device 112 and the recipient device 132. In this regard, the provider institution client application 114 may be at least partly supported by the mobile transaction circuit 170. In operation, when conducting a transaction between the sender device 112 and the recipient device 132, the sender may open the provider institution client application 114 (either directly or via the messaging application 116) and provide information to the mobile transaction circuit 170 regarding a gift to send to the recipient 130 via the recipient device 132. The recipient 130 may receive notification of the gift via the messaging application 136 and provide information regarding the gift (e.g., whether the gift is acceptable or unacceptable) to the mobile transaction circuit 170 via the messaging application 136.

As shown, the sender device 112 also includes the messaging application 116 and the recipient device 132 also includes the messaging application 136. The messaging application 116 and the messaging application 136 are structured to permit, enable, facilitate, and/or otherwise allow communication between two or more devices (e.g., the sender device 112 and the recipient device 132) via the network 180. The communication can be via text (e.g., text message) or audio (e.g., audio message). In some embodiments, the messaging application 116 and the messaging application 136 are the same messaging application. For example, if the sender device 112 and the recipient device 132 operate under an iOS operating system, the messaging application 116 and the messaging application 136 may be the iMessage application. In alternative embodiments, the messaging application 116 and the messaging application 136 are different messaging applications. For example, the sender device 112 may operate under the iOS operating system, and the recipient device may operate under an Andriod operating system. Accordingly, the messaging application 116 may be the iMessage application and the messaging application 136 may be the Android Message application. Regardless of the type of messaging application used in the sender device 112 and the recipient device 132, the sender device 112 and the recipient device 132 are able to communicate via the network 180.

The messaging application 116 may be a third party application relative to the provider institution client application 114. In other words, the provider institution client application 114 is communicably coupled to the messaging application 116 to selectively allow the messaging application 116 to access information stored in the provider institution computing system but does not direct, control, or otherwise influence the messaging application 116. In order for the messaging application 116 to access the provider institution computing system 160 via the provider institution client application 114 (e.g., to retrieve account information from the account database 168), the provider institution client application 114 must grant access to the messaging application 116. To do so, the provider institution client application 114 must verify that the sender device 112 is associated with a sender 110 that has an account at the provider institution. Verification can be achieved in various ways. For example, the provider institution client application may require the sender 110 to enter login credentials (e.g., a username and password used to access the provider institution computing system 160) via the sender device 112 for the provider institution client application 114. The provider institution client application may require verification via a biometric (e.g., a fingerprint, retina scan, face scan, etc., used to access the provider institution computing system 160) entered via the sender device 112. Once authenticated, the sender may access permissions and enable sharing of information or data with the messaging application 116 (or, at least, certain information).

In some embodiments, verification of the recipient associated with the recipient device 132 occurs when the recipient device 132 receives a message from the provider institution client application 114 that the recipient 130 has received a gift (an e-gift card, rewards points, etc.) from the sender device 112. For example, the recipient device 132 may receive a message from the provider institution client application 114 that, in order to receive the gift, the identity of the recipient 130 must be verified (e.g., by the recipient device 132). The provider institution client application 114 may then provide the recipient device 132 with verification options (e.g., login and password information, biometric information, etc.). In some embodiments, verification of the recipient device 132 occurs when the recipient device 132 attempts to redeem the gift. For example, if the gift is an e-gift card, when the recipient device 132 attempts to redeem the e-gift card with the selected vendor, the provider institution client application 114 may first prompt the recipient device 132 to verify the identity of the recipient. Upon verification of the identity of the recipient, the provider institution client application 114 allows the transaction to proceed.

In some embodiments, the identity of the sender 110 is verified prior to completing a transaction. For example, prior to sending an e-gift card, rewards points, cash, etc., to the recipient 130, the mobile transaction circuit 170 may prompt the sender 110 to enter verification information into the sender device 112. The verification information may include a personal identification number, a password, a biometric (e.g., a fingerprint, retina scan, etc.), a voice command, or any other type of information that may verify that the individual executing the transaction is the sender 110.

The sender device 112 also includes a network interface 118, and the recipient device 132 also includes a network interface 138. The network interface 118 and the network interface 138 facilitate the sending and receiving of data, information, and/or communications over the network 180 (e.g., to and from the provider institution computing system 160, etc.).

FIGS. 2-13 are illustrations of displays of the sender device 112 and the recipient device 132 in various stages of executing a p2p transaction, according to example embodiments. The p2p transaction may be executed, at least in part, by the provider institution computing system 160 (e.g., the processing circuit 162, the mobile transaction circuit 170, etc.), and facilitated by the provider institution client application 114.

Figure 2:
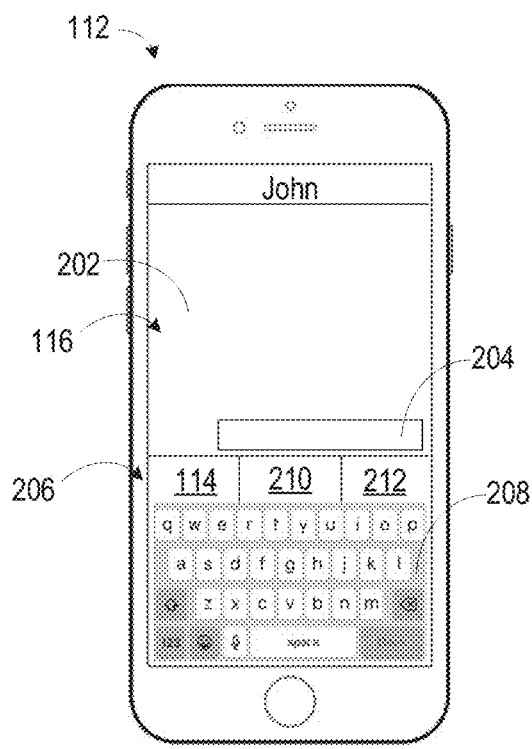
FIGS. 2-13 are illustrations of displays or graphical user interfaces of a sender device and a recipient device in various stages of executing a p2p transaction, according to example embodiments.

FIG. 2 is an illustration of the sender device 112 where the messaging application 116 is open. The sender device 112 includes a display 202 that can display incoming and outgoing messages processed by the messaging application 116. The messaging application includes a messaging input 208, a messaging preview 204, and an application selection portion 206. The messaging input 208 is structured to allow the sender 110 to enter a message the sender desires to send. As shown, the messaging input 208 includes a keyboard; however in some embodiments the messaging input 208 can include alternative ways to enter a message (e.g., a recorded voice message, writing a message with a finger on the display 202, etc.). The messaging preview 204 is configured to display the desired message as it is being composed so the sender 110 can view the message prior to sending the message.

The application selection portion 206 is configured to provide access to one or more applications on the sender device 112 such that the sender 110 can include information from the one or more applications in a text message without having to leave the messaging application and open a separate application to access the desired information. As shown, the application selection portion includes the provider institution client application 114, an application 210, and an application 212. The application 210 and the application 212 can be any type of application configured to provide information to the messaging application 116. Non-limiting examples of the application 210 and the application 212 include, but are not limited to, mobile wallet applications, mapping applications (e.g., Google Maps, Waze, etc.), image applications (e.g., applications that provide images to send to the recipient 130), social media applications (e.g., Facebook, LinkedIn, etc.), and ticket purchasing applications (e.g., TicketMaster, StubHub, etc.). In the example embodiment shown in FIG. 2, the sender 110 has opened the messaging application 116 to send a message to the recipient 130, shown as "John." The sender 110 may desire to send the recipient 130 a gift (for example, it may be the birthday of the recipient 130) and would like to send an e-gift card. To send an e-gift card without leaving the messaging application 116, the user selects the provider institution client application 114 on the display 202.

Figure 3:
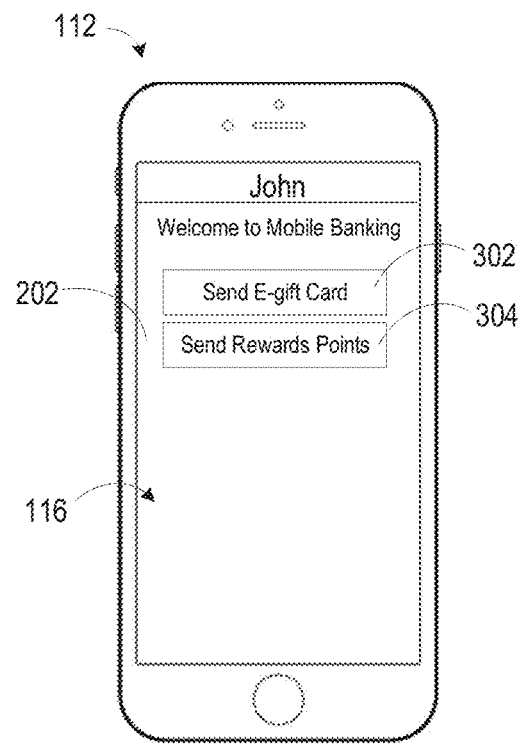

After selecting the provider institution client application 114, the sender 110 may be prompted to provide identification information to access the provider institution client application 114. The identification information can be provided and verified as described above. After the identity of the sender 110 is authenticated by the provider institution computing system 160, the display 202 changes (e.g., a new message window pops up) to indicate that the sender 110 is accessing the provider institution client application 114 through the messaging application 116, as shown in FIG. 3. In some embodiments, the name of the recipient 130 remains on the display 202 to indicate that the messaging application 116 is providing access to the provider institution client application 114. In some embodiments, other various components (e.g., the messaging input 208, etc.) of the messaging application 116 may continue to be viewed by the sender 110 when the provider institution client application 114 is open. The display 202 indicates to the sender 110 that the provider institution client application is open by, for example, providing a welcome message such as "welcome to mobile banking." In some embodiments, the provider institution client application 114 provides options for the sender 110 to select based on the goals of the sender 110. For example, the provider institution client application 114 provides a selection box 302 and a selection box 304. To begin a process of sending the recipient 130 an e-gift card, the sender 110 would select the selection box 302. To begin a process of sending the recipient 130 rewards points, the sender 110 would select the selection box 304. In some embodiments, additional options may be presented to the sender 110. For example, additional selection boxes may allow the sender 110 to access banking information such as account balances, rewards balances, etc. In an example embodiment, the sender 110 selects the selection box 302 to begin the process of providing an e-gift card to the recipient 130.

In some embodiments, access to the provider institution client application 114 is provided directly within the message to the recipient. For example, the interaction between the sender 110 and the provider institution client application 114 may occur wholly within the message to the recipient via an artificial intelligence ("AI") assistant. The artificial intelligence assistant may be implemented by the provider institution computing system and include logic and algorithms to process responses received from the sender 110 via the sender device 112 (e.g., commands, etc.) to execute the desired transaction. After selecting the provider institution client application 114, the AI assistant may present the sender 110 with options (further described below) regarding the type of transaction in which the sender 110 desires to engage, vendors from which to select a transaction, an amount of the transaction, etc. As the sender 110 interacts with the AI assistant, the sender 110 is not directed away from the message to the recipient, but the recipient does not receive notice of the interaction between the sender 110 and the AI assistant (i.e., the conversation with the recipient is concealed from the assistant yet the conversation with the assistant occurs in the same messaging window). In the embodiment described, the efficiency of the sender device 112 may be improved by using fewer message windows to execute the desired transaction.

Figure 4:
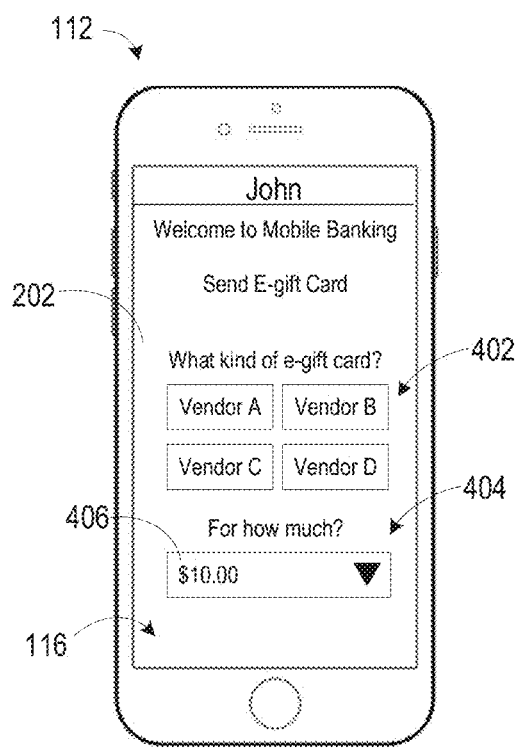

Upon selection of the selection box 302, the display 202 is updated to provide additional options related to the e-gift card, as shown in FIG. 4. A vendor selection portion 402 provides the sender 110 with options of vendors from which the e-gift card can be provided. The vendors listed in the vendor selection portion 402 may have an agreement with the provider institution 150 that rewards points for the provider institution 150 can be used to purchase gift cards instead of cash. Though four vendors are shown in the vendor selection portion 402, one of ordinary skill would understand that more or fewer vendors can be shown. For example, the sender 110 may be able to use a finger and scroll through a list of vendors. As another example, the sender 110 may be able to use a finger and swipe right or left to reveal other vendors from which e-gift cards are available.

The display 202 also includes a value selection portion 404 that allows the sender to select an amount for the e-gift card. The value selection portion 404 includes a drop down menu 406 that, when selected by the sender 110, provides the sender 110 with the available options for denominations of e-gift cards for the selected vendor. The drop down menu 406 is updated by the mobile transaction circuit 170 to display only e-gift card amounts for which the sender 110 has enough rewards points to cover. For example, upon selecting vendor A the drop down menu 406 is updated such that the only denominations of e-gift cards available for the sender 110 to select are those denominations for which the sender 110 has enough rewards points. As described above, the value of rewards points relative to each vendor may differ, so each time the sender 110 selects a different vendor from the vendor selection portion 402, the drop down menu 406 is updated to reflect the available e-gift card denominations available from that vendor. In the example embodiment shown, the sender 110 selects an e-gift card to vendor B for $10.00.

Figure 5:
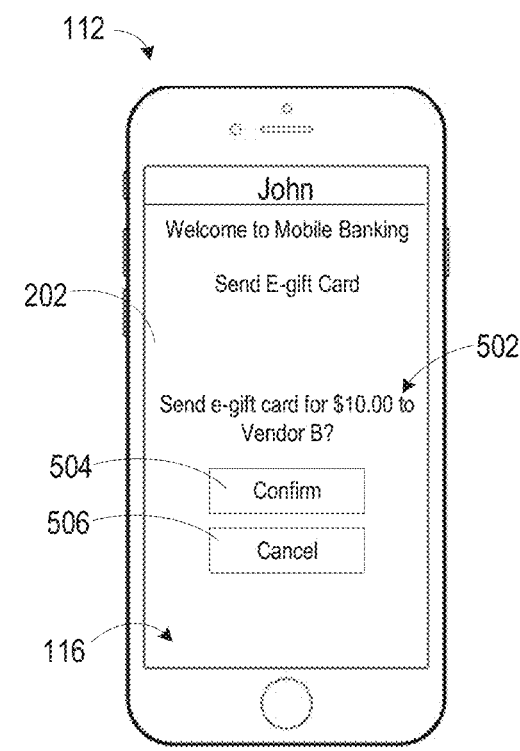

Upon selection of the vendor and the e-gift card amount, the display 202 is updated to allow the sender 110 to confirm the selection prior to sending the e-gift card to the recipient 130, as shown in FIG. 5. The display 202 includes a confirmation portion 502 with a selection box 504 and a selection box 506. To confirm the selection, the sender 110 selects the selection box 504. To cancel the selection and return to the previous screen, the sender 110 selects the selection box 506.

In some embodiments, upon selection of the selection box 504 to confirm the selection of the sender 110, the mobile transaction circuit 170 provides information related to the e-gift card (e.g., e-gift card number, authentication number, bar code, QR code, etc.) to the messaging application 116, and the sender device 112 sends a text message to the messaging application 136 of the recipient device 132. In this example embodiment, the e-gift card cannot be rejected or returned because the e-gift card number has already been assigned and sent to the recipient. The recipient 130 can open the e-gift card from the messaging application 136 to activate and/or use the e-gift card at the selected vendor.

Figure 6:
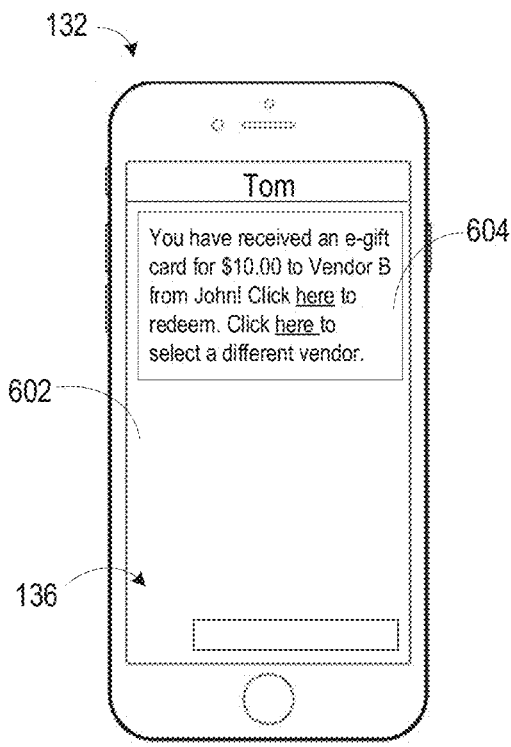

In some embodiments, and as shown in FIG. 6, prior to providing e-gift card information to the recipient, the provider institution client application 114 generates a text message 604 that is sent to the recipient device 132 to notify the recipient 130 that the sender 110 has sent the recipient 130 an e-gift card for the selected vendor. The recipient device 132 receives the text message 604 via the messaging application 136 and the text message 604 is displayed on a display 602. The text message 604 provides the recipient 130 with the option of redeeming the e-gift card selected by the sender 110, and the text message 604 also provides the recipient 130 with the option of selecting an e-gift card for a different vendor. If the recipient 130 chooses to accept the e-gift card selected by the sender 110, the recipient 130 selects the appropriate portion of the text message 604, and the mobile transaction circuit 170 then provides the recipient 130 with information related to the e-gift card (e.g., e-gift card number, authentication number, bar code, QR code, etc.) for the recipient 130 to use to redeem the e-gift card. In some embodiments, the information related to the e-gift card (e-gift card number, authentication number, bar code, QR code, etc.) is generated by the recipient device 132 and subsequently provided to the mobile transaction circuit 170 as part of a transaction (e.g., redeeming the gift). The mobile transaction circuit 170 provides the information related to the e-gift card to the selected vendor such that the e-gift card is recognized by the selected vendor when the recipient 130 presents the information to the vendor when redeeming the e-gift card. In some embodiments, the information may be encoded, such as a QR code or bar code, or provided as an authentication number. In these configurations, use restrictions may be encoded or embedded within the information, such as the information being limited to a predefined duration of time (e.g., 2 days). In some embodiments, other use restrictions may be placed on the QR code, bar code, authentication number, etc. Examples of such other use restrictions may include 1) the e-gift card cannot be transferred to another device, 2) the e-gift card cannot be used in a physical store, 3) the e-gift card cannot be used by any individual other than the recipient 130, 4) the maximum value of the e-gift card, etc. In some embodiments, the information generated (e.g., by the mobile transaction circuit 170 or the recipient device 132) includes information linked to the account of the sender 110. For example, the information generated may include an encryption of the account number of the sender 110 such that, upon acceptance or redemption of the e-gift card, the account of the sender 110 is debited. As another example, the information generated may include a token associated with the account of the sender 110 such that, upon acceptance or redemption of the e-gift card, the account of the sender 110 is debited.

By waiting until the e-gift card is approved by the recipient to provide the e-gift card information, undesirable e-gift cards will not be provided to those that prefer an e-gift card to a different vendor. Thus, difficulties associated with unwanted e-gift cards (e.g., expiration of the gift, re-gifting the undesirable gift, trying to find a desirable item at an undesirable vendor, etc.) are avoided by only providing the e-gift card information upon approval of the gift by the recipient 130.

Figure 7:
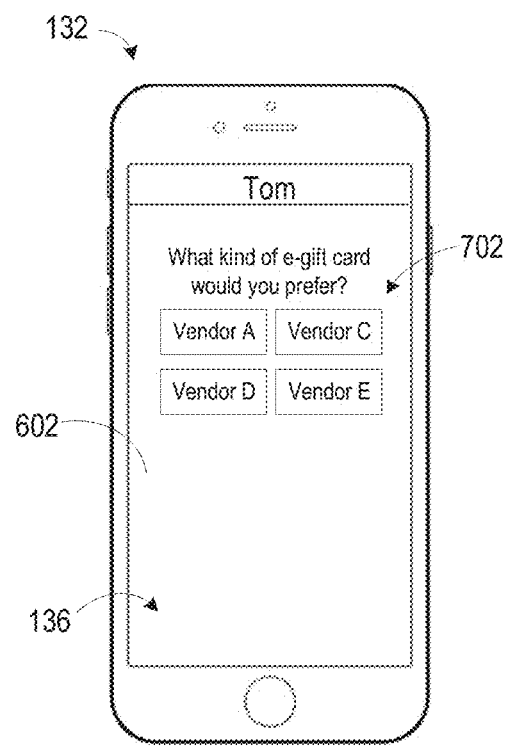

If the recipient determines that the e-gift card selected by the sender 110 is undesirable, the recipient 130 selects the appropriate portion of the text message 604 and the provider institution client application 114 is opened through the messaging application 136 and shown on the display 602, as shown in FIG. 7.

The provider institution client application 114 provides the recipient 130 with an alternative vendor selection portion 702 from which the recipient 130 can select an alternative e-gift card. As shown, the vendor from which the sender 110 selected the undesirable e-gift card (vendor B) is not included in the list of vendors provided on the alternative vendor selection portion 702. In some embodiments, the value of the alternative e-gift cards from each of the vendors presented in the alternative vendor selection portion 702 is the same as the value of the e-gift card provided by the sender 110 (e.g., $10.00). In some embodiments, the value of alternative e-gift cards from different vendors may differ depending on the relative value of rewards points for the various vendors. For example, though the sender 110 chose to send an e-gift card for vendor B for $10.00, an equivalent alternative e-gift card for vendor D may be $15.00. In some embodiments, the alternative vendor selection portion 702 may also include the value of the alternative e-gift cards associated with each vendor.

Upon selection of a vendor for the alternative e-gift card by the recipient 130, the mobile transaction circuit 170 provides information related to the alternative e-gift card (e.g., e-gift card number, authentication number, bar code, QR code, etc.) to the messaging application 136. The recipient can then redeem the alternative e-gift card by using the information provided by the mobile transaction circuit 170. The account database 168 then deducts the required amount of rewards points from the rewards account of the sender 110.

Figure 8:
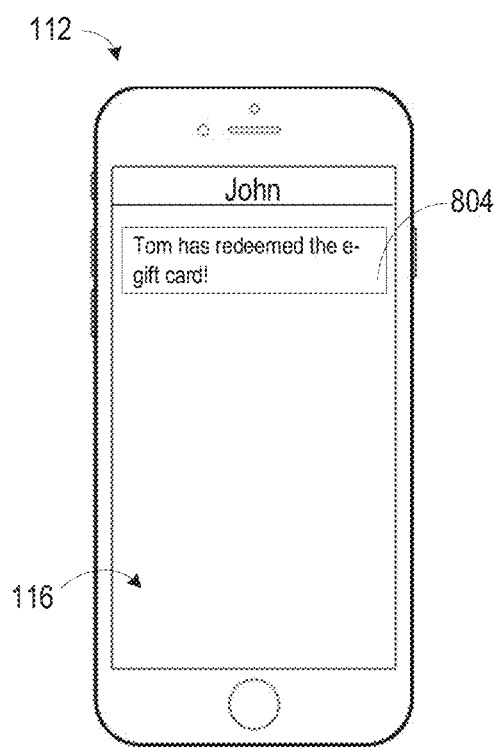

As shown in FIG. 8, the mobile transaction circuit 170 then provides the sender 110 with a confirmation message 804 via the messaging application 116 that the recipient 130 has redeemed the e-gift card. In some embodiments, the confirmation message 804 includes additional information such as the amount of the e-gift card and the vendor for the e-gift card. In some embodiments, the confirmation message 804 masks (e.g., removes, omits, redacts, does not display, etc.) the additional information such that the sender 110 does not feel as though the e-gift card provided by the sender 110 was undesirable.

Providing an e-gift card to the recipient 130 by the various embodiments described herein allows the recipient 130 to receive an e-gift card via a messaging application, thereby providing a streamlined e-gift card transaction. Furthermore, the embodiments described herein allow the recipient 130 to receive a desirable alternative e-gift card without requiring the recipient 130 to notify the sender 110 that the e-gift card provided is undesirable, thereby preventing the e-gift card sent by the sender 110 from going unused.

Figure 9:
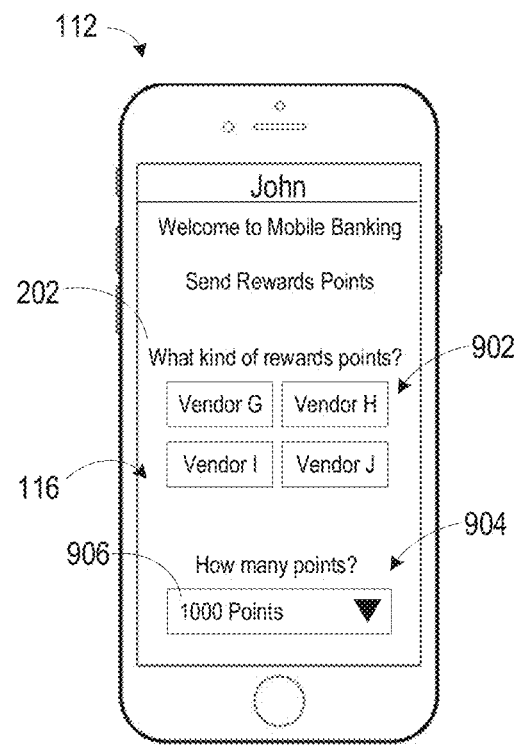

In another embodiment, and as shown in FIG. 9, if the sender 110 selects the selection box 304, indicating a desire to send the recipient 130 rewards points, the provider institution client application 114 provides the sender 110 with a vendor selection portion 902 and a points selection portion 904 via the messaging application 116. The vendor selection portion 902 provides the sender 110 with options to select a vendor for which a rewards account of the recipient 130 will be credited with rewards points upon completion of the transaction. In some embodiments, the vendor selection portion 902 includes the provider institution 150 in addition to other vendors. In some embodiments, the vendor selection portion 902 does not include the provider institution 150. In some embodiments, the vendor selection portion 902 is absent and the rewards points are presumed to be transferred to a rewards account for the recipient 130 associated with the provider institution 150. The points selection portion 904 includes a drop down menu 906 from which the sender 110 can select an amount of points to send to the recipient 130. The amount of points shown in the drop down menu 906 depends on the balance of rewards points in the rewards account of the sender 110. For example, if the sender 110 has a balance of 10,000 points, the drop down menu 906 may provide the sender 110 with various options of rewards points values up to and including the total amount of points in the rewards points account of the sender 110 (e.g., 1,000 points, 2,000 points, 5,000 points, 10,000 points, etc.).

Figure 10:
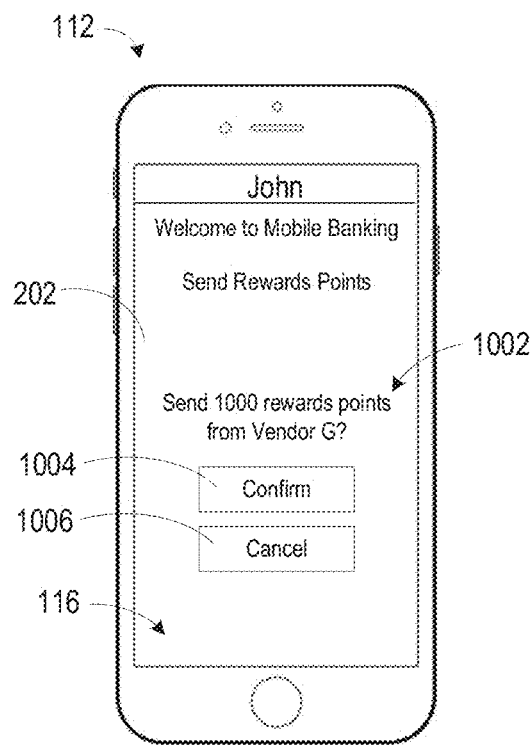

Upon selection of the rewards points amount, the display 202 is updated to allow the sender 110 to confirm the selection prior to sending the rewards points to the recipient 130, as shown in FIG. 10. The display 202 includes a confirmation portion 1002 with a selection box 1004 and a selection box 1006. To confirm the selection, the sender 110 selects the selection box 1004. To cancel the selection and return to the previous screen, the sender 110 selects the selection box 1006.

In some embodiments, upon selection of the selection box 1004 to confirm the selection of the sender 110, the mobile transaction circuit 170 provides information related to the rewards points (e.g., the amount of points provided, the vendor to which points are provided, etc.) to the messaging application 116, and the sender device 112 sends a text message 1104 to the messaging application 136 of the recipient device 132. In this example embodiment, the rewards points cannot be rejected or returned because, upon confirmation of the rewards points by the sender 110, the rewards points are automatically assigned to and sent to the recipient. The recipient 130 can access the rewards account of the recipient 130 by accessing the rewards account for the selected vendor.

Figure 11:
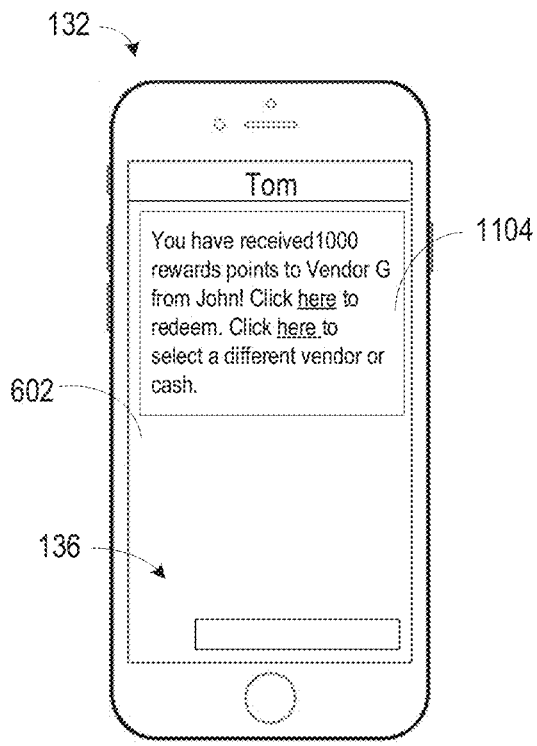

In some embodiments, and as shown in FIG. 11, prior to providing the rewards points to the recipient 130, the provider institution client application 114 generates a text message 1104 that is sent to the recipient device 132 to notify the recipient 130 that the sender 110 has sent the recipient 130 rewards points for the selected vendor. The recipient device 132 receives the text message 1104 via the messaging application 136 and the text message 1104 is displayed on a display 602. The text message 1104 provides the recipient 130 with the option of redeeming the rewards points selected by the sender 110, and the text message 1104 also provides the recipient 130 with the option of selecting alternative rewards points for a different vendor. If the recipient 130 chooses to accept the rewards points selected by the sender 110, the recipient 130 selects the appropriate portion of the text message 1104, and the mobile transaction circuit 170 then provides the recipient 130 with information related to the rewards points (e.g., the amount of points provided, the vendor to which points are provided, etc.). By waiting until the rewards points are approved by the recipient to provide the e-gift card information, undesirable rewards points will not be provided to those that prefer rewards points associated with a different vendor. Thus, difficulties associated with unwanted rewards points (e.g., expiration of the points, re-gifting the undesirable points, trying to find a desirable item at an undesirable vendor, etc.) are avoided by providing the recipient 130 with alternative rewards points options.

Figure 12:
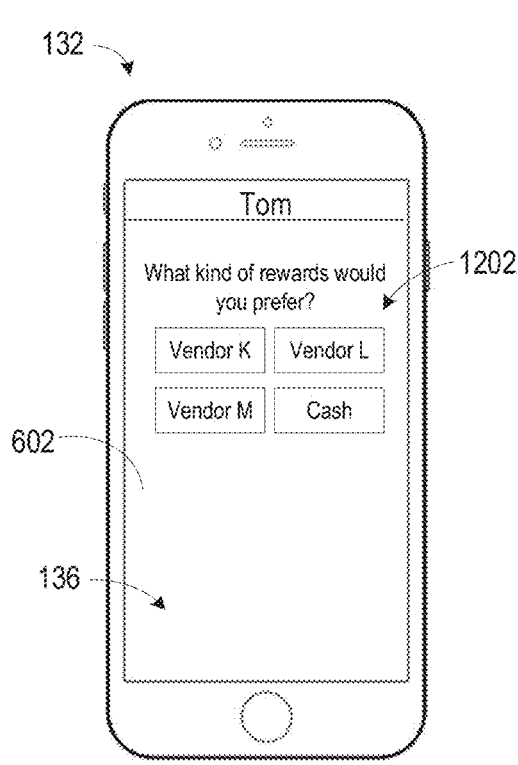

If the recipient determines that the rewards points selected by the sender 110 is undesirable, the recipient 130 selects the appropriate portion of the text message 604 and the provider institution client application 114 is opened through the messaging application 136 and shown on the display 602, as shown in FIG. 12.

The provider institution client application 114 provides the recipient 130 with an alternative vendor selection portion 1202 from which the recipient 130 can select alternative rewards points. As shown, the vendor from which the sender 110 selected the undesirable rewards points is not included in the list of vendors provided on the alternative vendor selection portion 1202. In some embodiments, the value of the alternative rewards points from each of the vendors presented in the alternative vendor selection portion 702 is the same as the value of the rewards points provided by the sender 110 (e.g., 1,000 points). In some embodiments, the value of the alternative rewards points from different vendors may differ depending on the relative value of rewards points for the various vendors. For example, though the sender 110 chose to send 1,000 rewards points to the recipient 130 from vendor G, an equivalent amount of alternative rewards points for vendor K may be 2,000 points. In some embodiments, the alternative vendor selection portion 1202 may also include the value of the alternative rewards points associated with each vendor. In some embodiments, the recipient can select a cash value associated with the rewards, where the cash value can be provided directly to a desired account (e.g., an account with the provider institution 150) or provided via a check sent to the recipient (e.g., a paper check or an electronic check).

Upon selection of a vendor by the recipient 130, the mobile transaction circuit 170 provides information related to the alternative rewards points (e.g., the amount of points provided, the vendor to which points are provided, etc.) to the messaging application 136. The recipient 130 can then redeem the desired rewards points. The account database 168 then deducts the required amount of rewards points from the rewards account of the sender 110. In some embodiments, the interaction between the recipient 130 and the provider institution client application 114 occurs in a separate window (e.g., a pop up window) that is outside of a message between the sender 110 and the recipient 130. In some embodiments, the interaction between the recipient 130 and the provider institution client application 114 occurs within a current text message window between the recipient 130 and the sender 110. In such embodiments, the AI assistant communicates with the recipient 130 via the messaging application 136 within the current text message window but without the knowledge of the sender 110 (e.g., the messages between the recipient 130 and the AI assistant are not broadcast to the sender 110 via the messaging system 116).

Figure 13:
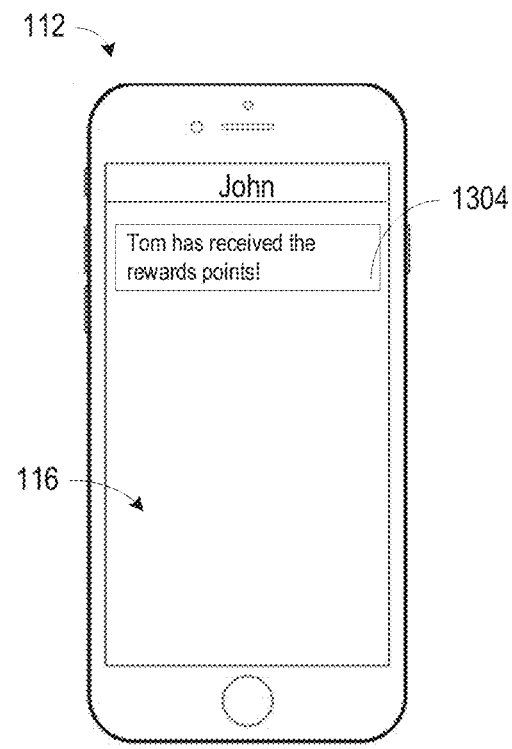

As shown in FIG. 13, the mobile transaction circuit 170 then provides the sender 110 with a confirmation message 1304 via the messaging application 116 that the recipient 130 has redeemed the rewards points. In some embodiments, the confirmation message 804 includes additional information such as the amount of the rewards points and the vendor for the rewards points. In some embodiments, the confirmation message 1304 masks (e.g., removes, omits, redacts, does not display, etc.) the additional information such that the sender 110 does not feel as though the e-gift card provided by the sender 110 was undesirable.

Providing rewards points to the recipient 130 by the various embodiments described herein allows the recipient 130 to receive rewards points via a messaging application, thereby providing a streamlined transaction. Furthermore, the embodiments described herein allow the recipient 130 to receive desirable alternative rewards points without requiring the recipient 130 to notify the sender 110 that the rewards points provided are undesirable, thereby preventing the rewards points sent by the sender 110 from going unused.

Figure 14:
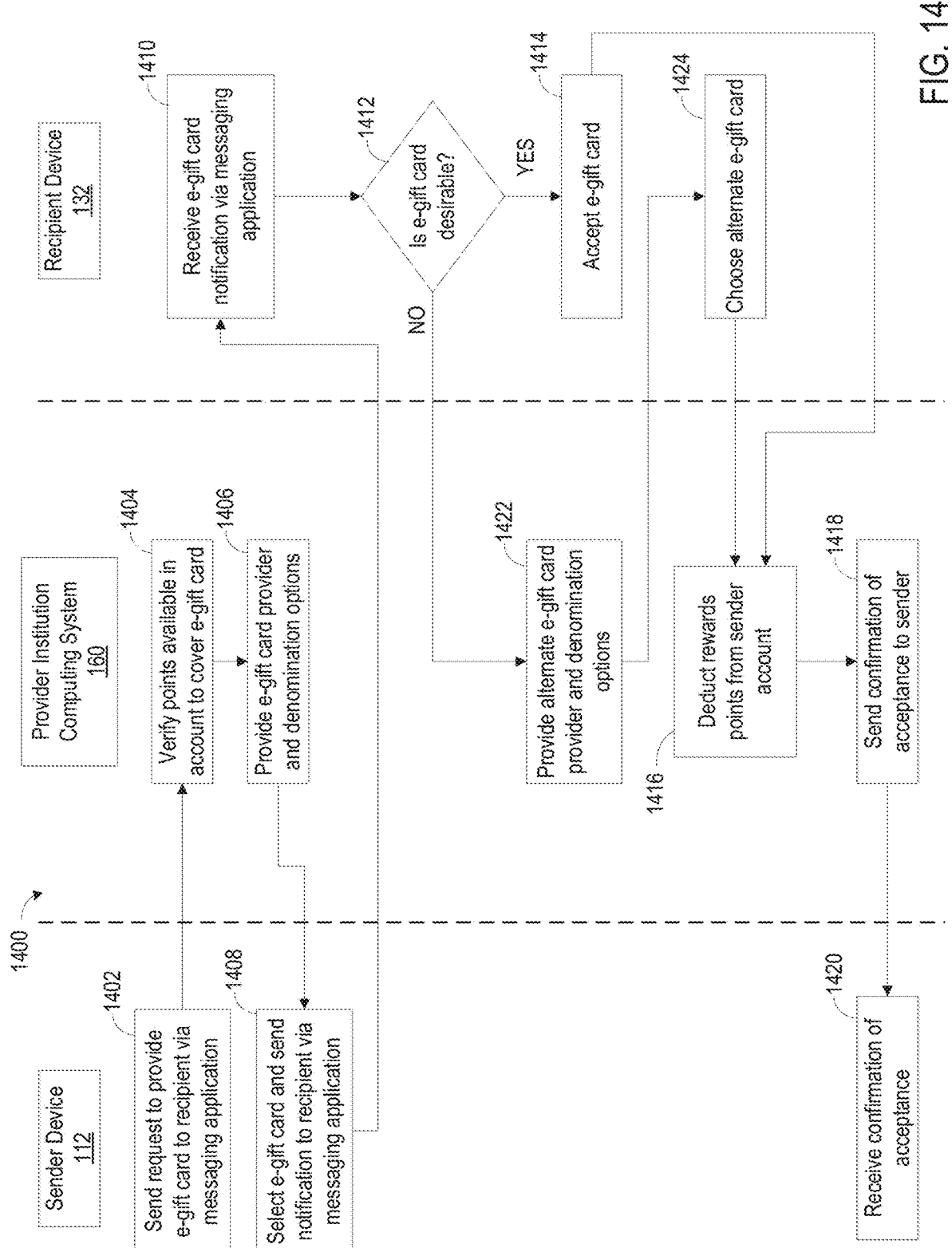
FIG. 14 is a flow diagram of a p2p method for providing an e-gift card to a recipient, according to an example embodiment.

FIG. 14 is a flow diagram of a p2p method 1400 for providing an e-gift card to a recipient as a gift, according to an example embodiment. The method may be implemented at least in part by the provider institution computing system 160, and facilitated by the provider institution client application 114.

At process 1402, the sender device 112 sends a request to the provider institution computing system 160 to provide an e-gift card to the recipient 130. For example, the sender device 112 may send a request via the messaging application 116 to the provider institution computing system 160 to send an e-gift card to the recipient 130 via the recipient device 132.

At process 1404, the provider institution computing system receives the request from the sender device 112 and verifies the available points in the rewards account of the sender 110 to purchase the e-gift card. For example, the mobile transaction circuit 170 communicates with the account database 168 to verify that the rewards account of the sender 110 includes sufficient points to purchase a desired e-gift card.

At process 1406, e-gift card provider and denomination options are provided. For example, the mobile transaction circuit 170 provides, via the messaging application 116, a list of vendors from which the sender 110 can select the desired vendor from which the e-gift card will be provided. The mobile transaction circuit 170 also provides, via the messaging application 116, different monetary values that can be applied to the e-gift card. As described above, in some embodiments the provider and denomination options may be provided within a separate message window between the provider institution client application 114 and the sender 110. In some embodiments, the provider and denomination options maybe provided within a message window between the sender 110 and the recipient 130 without the recipient 130 seeing the messages between the sender 110 and the provider institution client application 114.

At process 1408, the desired e-gift card is selected and notification is sent to the recipient 130 via the messaging application 136. For example, the sender 110 may select a gift card to vendor X in the amount of $25.00. The mobile transaction circuit 170 prepares and sends a text message to the recipient device 132 via the messaging application 136 notifying the recipient 130 that the sender 110 has sent an e-gift card.

At process 1410, the recipient 130 receives the notification via the messaging application 136. At 1412, the recipient 130 determines whether the e-gift card provided by the sender 110 is desirable. In some embodiments, for example, the recipient 130 may enjoy shopping at vendor X and determine that the e-gift card is desirable.

At process 1414, the recipient 130 accepts the e-gift card. For example, the text message notification received by the recipient 130 may include a link to select to accept the e-gift card. Upon selection of the link, the e-gift card is accepted and the mobile transaction circuit 170 provides the recipient with information related to the e-gift card via the messaging application 136. As described above, in some embodiments the recipient device 132 generates the information related to the e-gift card and provides the information to the mobile transaction circuit 170.

At process 1416, rewards points are deducted from the account of the sender 110. For example, after the recipient 130 accepts the e-gift card, the account database 168 deducts the rewards points required to purchase the e-gift card from the account of the sender 110. In the example embodiment described, purchasing an e-gift card for $25.00 to vendor X may require 25,000 rewards points. Accordingly, the account database 168 deducts 25,000 rewards points from the rewards account of the sender 110.

At process 1418, a confirmation of acceptance is sent to the sender 110. For example, the mobile transaction circuit 170 composes and sends a message to the messaging application 116. In some embodiments, the message may indicate that the recipient 130 redeemed the e-gift card and provide additional details regarding the transaction (e.g., the name of the vendor and the amount of the e-gift card). In some embodiments, the message may omit, mask, or otherwise obscure additional details regarding the transaction to prevent the sender 110 from knowing that the recipient chose an alternative e-gift card. At 1420, the sender 110 receives confirmation of acceptance of the e-gift card.

Returning to process 1412, the recipient 130 may determine that the e-gift card selected by the sender may be undesirable (e.g., the recipient 130 does not shop with vendor X, etc.). For example, the text message notification received by the recipient 130 may include a link to select to view alternative e-gift card options. Upon selection of the link, a communication is sent from the recipient device 132 to the mobile transaction circuit 170 that the recipient desires to view alternative e-gift card options.

At process 1422, alternative e-gift card options and denominations are provided. For example, the mobile transaction circuit 170 provides to the recipient 130, via the messaging application 136, alternative e-gift card options the recipient 130 can select instead of the e-gift card selected by the sender 110. In some embodiments, the alternative e-gift card options are of equal monetary value to the e-gift card selected by the sender 110. In some embodiments, the alternative e-gift card options are of different monetary value than the e-gift card selected by the sender 110.

At process 1424, the recipient 130 chooses the desired alternative e-gift card. For example, the recipient 130 may prefer to shop at vendor Z and may therefore select an alternative e-gift card for vendor Z. The method 1400 proceeds to steps 1416, 1418, and 1420 as described.

Figure 15:
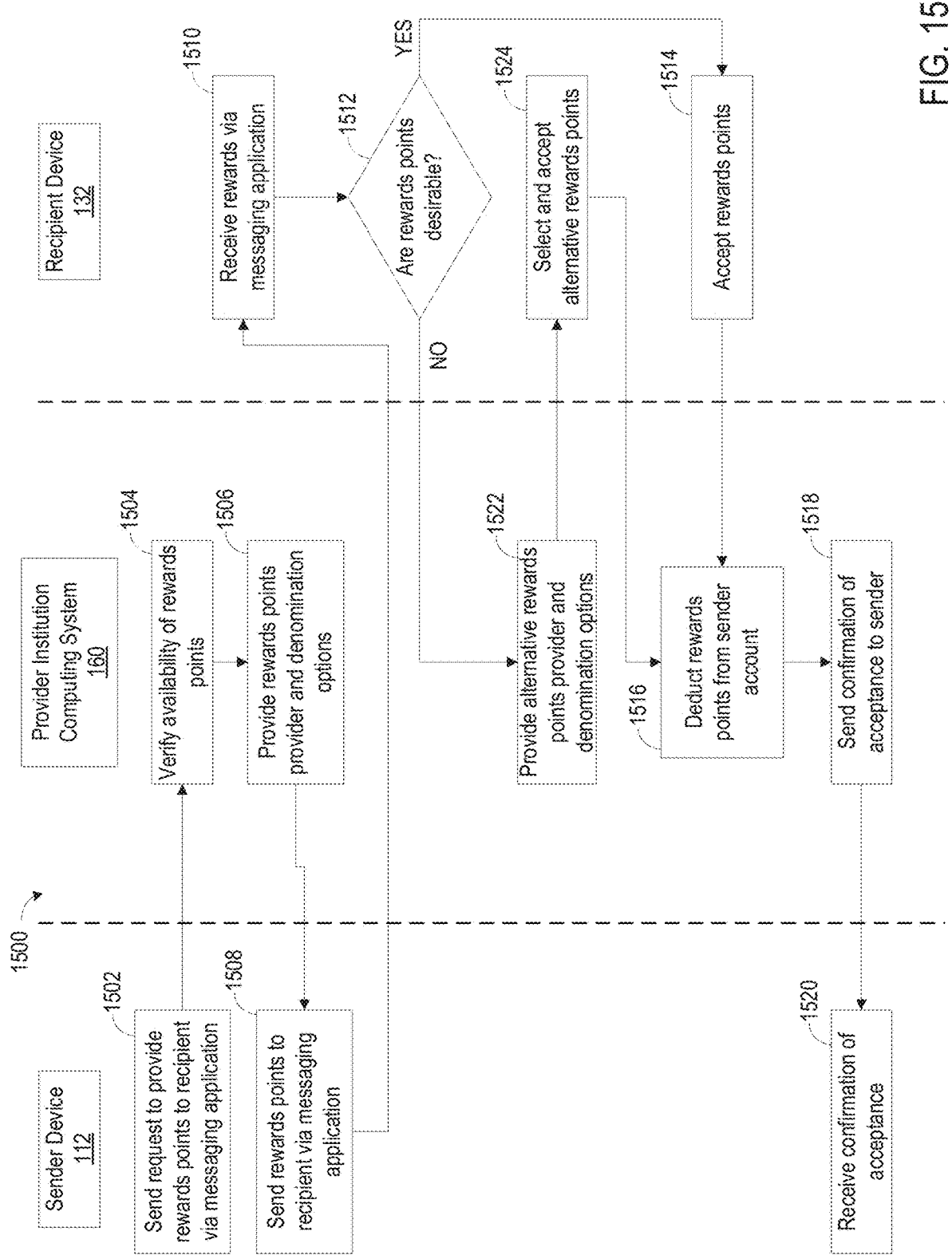
FIG. 15 is a flow diagram of a p2p method for providing rewards points to a recipient, according to an example embodiment.

FIG. 15 is a flow diagram of a p2p method 1500 for providing rewards points to a recipient as a gift, according to an example embodiment. The method may be implemented at least in part by the provider institution computing system 160, and facilitated by the provider institution client application 114.

At process 1502, the sender device 112 sends a request to the provider institution computing system 160 to provide rewards points to the recipient 130. For example, the sender device 112 may send a request via the messaging application 116 to the provider institution computing system 160 to send rewards points to the recipient 130 via the recipient device 132.

At process 1504, the provider institution computing system 160 receives the request from the sender device 112 and verifies the available points in the rewards account of the sender 110. For example, the mobile transaction circuit 170 communicates with the account database 168 to verify that the rewards account of the sender 110 includes sufficient points to conduct the desired transaction.

At process 1506, rewards points provider and denomination options are provided. For example, the mobile transaction circuit 170 provides, via the messaging application 116, a list of vendors from which the sender 110 can select the desired vendor from which the rewards points will be provided. The mobile transaction circuit 170 also provides, via the messaging application 116, different point values that can be provided.

At process 1508, the desired rewards points are selected and notification is sent to the recipient 130 via the messaging application 136. For example, the sender 110 may select rewards points for vendor X in the amount of 5,000 points. The mobile transaction circuit 170 prepares and sends a text message to the recipient device 132 via the messaging application 136 notifying the recipient 130 that the sender 110 has sent rewards points.

At process 1510, the recipient 130 receives the notification via the messaging application 136. At 1512, the recipient 130 determines whether the rewards points provided by the sender 110 are desirable. In some embodiments, for example, the recipient 130 may enjoy shopping at vendor X and determine that the rewards points are desirable.

At process 1514, the recipient 130 accepts the rewards points. For example, the text message notification received by the recipient 130 may include a link to select to accept the rewards points. Upon selection of the link, the rewards points are accepted and the mobile transaction circuit 170 provides the recipient with information related to the rewards points via the messaging application 136.

At process 1516, rewards points are deducted from the account of the sender 110. For example, after the recipient 130 accepts the rewards points, the account database 168 deducts the corresponding amount of rewards points from the account of the sender 110. In the example embodiment described, sending 5,000 rewards points to vendor X may require 5,000 rewards points from the rewards account of the sender 110. Accordingly, the account database 168 deducts 5,000 rewards points from the rewards account of the sender 110.

At process 1518, a confirmation of acceptance is sent to the sender 110. For example, the mobile transaction circuit 170 composes and sends a text message to the messaging application 116. In some embodiments, the text message may indicate that the recipient 130 accepted the rewards points and provide additional details regarding the transaction (e.g., the name of the vendor and the amount of rewards points transferred). In some embodiments, the message may omit, mask, or otherwise obscure additional details regarding the transaction to prevent the sender 110 from knowing that the recipient chose alternative rewards points. At 1520, the sender 110 receives confirmation of acceptance of the rewards points.

Returning to process 1512, the recipient 130 may determine that the rewards points selected by the sender may be undesirable (e.g., the recipient 130 does not shop with vendor X, etc.). For example, the text message notification received by the recipient 130 may include a link to select to view alternative rewards points options. Upon selection of the link, a communication is sent from the recipient device 132 to the mobile transaction circuit 170 that the recipient desires to view alternative rewards points options.

At process 1522, alternative rewards points options and denominations are provided. For example, the mobile transaction circuit 170 provides to the recipient 130, via the messaging application 136, alternative rewards points options the recipient 130 can select instead of the rewards points selected by the sender 110. In some embodiments, the alternative rewards points options are of equal value to the rewards points selected by the sender 110. In some embodiments, the alternative rewards points options are of different value than the rewards points selected by the sender 110.

At process 1524, the recipient 130 chooses the desired alternative rewards points. For example, the recipient 130 may prefer to shop at vendor Z and may therefore select alternative rewards points for vendor Z. The method 1500 proceeds to steps 1516, 1518, and 1520 as described.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. Each respective "circuit" may include machine-readable media for configuring the hardware to execute the functions described herein. In some embodiments, a "circuit" may only be machine-readable media that is executable by separate hardware (e.g., one or more processors). The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A provider institution computing system of a provider institution, comprising:
   a network interface circuit; and
   a processing circuit coupled to the network interface circuit, the processing circuit comprising a processor coupled to a non-transitory memory storing instructions that, when executed by the processor, cause the processing circuit to perform operations comprising:

receive a request from a sender device associated with a sender to send a gift to a recipient device associated with a recipient via a second messaging application of the recipient device, the second messaging application different from a first messaging application of the sender device, the request provided in response to a first interaction at a first user interface, the first interaction indicating a selection of a first value of points, the first user interface provided by a provider institution client application associated with the provider institution computing system and stored at the sender device and invoked by and displayed within the first messaging application as an overlay;

determine, using a biometric verification process, that the sender initiated the request to send the gift from the sender device, and that the sender is identified in a first account associated with the sender at the provider institution;

verify that the first account associated with the sender includes the first value of points;

convert the first value of points to a first gift value having a first gift type and a second gift value having a second gift type, the first gift value being different than the second gift value;

provide a first gift option to the sender device for display in a second user interface of the first messaging application via the provider institution client application, the first gift option comprising a first gift having the first gift value and a second gift having the second gift value, the second user interface comprising an interactive element that enables scrolling between the first gift and the second gift;

receive a first gift selection from the first messaging application via the provider institution client application, the first gift selection comprising one of the first gift or the second gift;

responsive to receiving the first gift selection, provide data to generate a gift message to the sender device, causing the provider institution client application to generate and transmit the gift message to the recipient via the second messaging application, the gift message comprising an interactive user interface element configured to present a third user interface, the third user interface comprising a plurality of alternative gift options;

based on a respective interaction with an alternative gift selection of the plurality of alternative gift options, receive a request for a monetary amount in lieu of the first gift selection via the third user interface of the second messaging application displayed at the recipient device; and authenticate, using a second biometric verification process, that the recipient device is associated with the recipient to permit the conversion of the first value of points to the monetary amount.

2. The provider institution computing system of claim 1, wherein the instructions, when executed by the processor, further cause the processing circuit to perform operations comprising:

provide a second gift option to the second messaging application, the second gift option comprising a first alternative gift and a second alternative gift, wherein the first alternative gift and the second alternative gift are different than the first gift selection; and receive a second gift selection from the second messaging application, the second gift selection comprising one of the first alternative gift or the second alternative gift.

3. The provider institution computing system of claim 2, wherein the instructions, when executed by the processor, further cause the processing circuit to perform operations comprising send a gift acceptance confirmation to the first messaging application, wherein the gift acceptance confirmation obscures information associated with the second gift selection.

4. The provider institution computing system of claim 3, wherein the information associated with the second gift selection includes one or more of a vendor associated with the second gift selection, a monetary value associated with the second gift selection, or a value of rewards points associated with the second gift selection.

5. The provider institution computing system of claim 1, wherein the first gift is a first e-gift card having a first monetary value associated with a first vendor and the second gift is a second e-gift card having a second monetary value associated with a second vendor.

6. The provider institution computing system of claim 2, wherein the instructions, when executed by the processor, further cause the processing circuit to perform operations comprising providing a code to the second messaging application, the code associated with the second gift selection.

7. The provider institution computing system of claim 1, wherein the first gift comprises a first amount of rewards points associated with a first vendor and the second gift comprises a second amount of rewards points associated with a second vendor.

8. The provider institution computing system of claim 6, wherein the code comprises one of a bar code, a quick response (QR) code, or an authentication number.

9. The provider institution computing system of claim 2, wherein the instructions, when executed by the processor, further cause the processing circuit to receive a code from the second messaging application, the code associated with the second gift selection.

10. The provider institution computing system of claim 9, wherein the code comprises one of a bar code, a quick response (QR) code, or an authentication number.

11. A sender mobile device associated with a sender, the sender mobile device comprising:

a network interface circuit; and a processing circuit coupled to the network interface circuit, the processing circuit comprising a processor coupled to a non-transitory memory storing instructions that, when executed by the processor, cause the processing circuit to perform operations comprising:

launch a messaging application to enable a communication between the sender and a recipient;

receive a request from within the messaging application to initiate a transaction with the recipient, the request provided in response to a first interaction at a first user interface, the request indicating a selection of a first value of points, the first user interface provided by a provider institution client application invoked by and displayed within the messaging application as an overlay;

obtain biometric information for a first biometric verification process that determines that the sender initiated the transaction with the recipient;

receive a prompt that is displayed within the messaging application from the provider institution client application, the prompt including a plurality of icons associated with the transaction, the prompt comprising an interactive element that enables scrolling between the plurality of icons;

receive, via the provider institution client application, a selection of an icon of the plurality of icons by the sender from within the messaging application, the selection corresponding to one of a first transaction option or a second transaction option;

send, via the provider institution client application, a first communication to a recipient messaging application that is viewable by the recipient via a recipient device, the first communication comprising a first option corresponding to the selection of the icon by the sender and a second option providing an option to convert the first value of points to monetary amount in lieu of the first option; and receive and display, via the provider institution client application, a confirmation that the transaction is complete responsive to a second biometric process of the recipient initiated at the recipient device being satisfied.

12. The sender mobile device of claim 11, wherein the prompt and selection are masked from being viewed by the recipient via a recipient messaging application hosting communications with the messaging application.

13. The sender mobile device of claim 11, wherein the sender mobile device is configured to convert a first value of the transaction to a second value, wherein the first value and the second value correspond to an amount of points in a rewards account associated with the sender.

14. The sender mobile device of claim 12, wherein the icon is associated with a cash value of a gift and one or more vendors associated with the gift.

15. The sender mobile device of claim 12, wherein the icon is associated with a value of rewards points and one or more vendors associated with the rewards points.

16. The sender mobile device of claim 11, wherein the confirmation masks information associated with the transaction.

17. A method of sending a first gift from a first messaging application via a first provider institution client application executing on a sender device to a second messaging application associated with a recipient device, comprising:

authenticating, by a processing circuit using a first biometric verification process, an identity of a sender associated with the sender device based on information provided by the sender device associated with the sender responsive to a request to provide a gift to a recipient that is received via the first provider institution client application of the sender device, the request provided in response to a first interaction at a first user interface, the first interaction indicating a selection of a first value of points, the first user interface provided by a provider institution client application stored at the sender device and invoked by and displayed within the first messaging application as an overlay;

determining, by the processing circuit, based on a message received from a second provider institution client application of the recipient device invoked by the second messaging application, that the first gift is undesirable;

providing, by the processing circuit and for display in a second user interface of the second provider institution client application, an alternative gift option comprising a first alternative gift, a second alternative gift, an option to convert the first value of points to a monetary amount in lieu of the first alternative gift and the second alternative gift, wherein the first alternative gift and the second alternative gift are different than the first gift, the second user interface comprising an interactive element that enables scrolling between the first alternative gift, the second alternative gift, and the option to convert the first value of points to the monetary amount;

converting, by the processing circuit, the first value of points to a first alternative value of the first alternative gift and a second alternative value of the second alternative gift, wherein the first value of points, the first alternative value, and the second alternative value correspond to a value of points in an account held by the sender;

receiving, by the processing circuit, a second gift selection from the second provider institution client application, the second gift selection comprising one of the first alternative gift or the second alternative gift;

based on a respective interaction with the option to convert the first value of points to the monetary amount, receiving, by the processing circuit, information related to the second gift selection, wherein the information related to the second gift selection comprises a request for the monetary amount in lieu of the first alternative gift and the second alternative gift; and authenticating, by the processing circuit using a second biometric verification process, that the recipient device is associated with the recipient to permit acceptance of the second gift selection.

18. The method of claim 17, wherein the information related to the second gift selection includes one a bar code, a quick response (QR) code, of an authentication number.

19. The method of claim 18, wherein the identity of the recipient is authenticated by the processing circuit when the information related to the second gift selection is provided to a vendor associated with the second gift selection.

20. The method of claim 19, wherein the vendor associated with the second gift selection is a provider institution computing system associated with the processing circuit.

* * * * *